United States Patent [19]

Ludwig

[11] Patent Number: 5,304,430
[45] Date of Patent: Apr. 19, 1994

[54] ACID-BASE CONCENTRATION CELL FOR ELECTRIC POWER GENERATION

[75] Inventor: Frank A. Ludwig, Rancho Palos Verdes, Calif.

[73] Assignee: Hughes Aircraft Company, Los Angeles, Calif.

[21] Appl. No.: 21,417

[22] Filed: Feb. 22, 1993

[51] Int. Cl.$^5$ ............................................. H01M 8/06
[52] U.S. Cl. ......................................... 429/17; 429/20; 429/46
[58] Field of Search ................. 429/14, 17, 19, 34, 429/38, 39, 46, 20, 26

[56] References Cited

U.S. PATENT DOCUMENTS

| | | | |
|---|---|---|---|
| 4,738,904 | 4/1988 | Ludwig et al. | 429/17 |
| 4,810,596 | 3/1989 | Ludwig | 429/17 |
| 4,865,925 | 9/1989 | Ludwig et al. | 429/12 |
| 5,208,112 | 5/1993 | Ludwig et al. | 429/20 |

Primary Examiner—Anthony Skapars
Attorney, Agent, or Firm—M. E. Lachman; M. W. Sales; W. K. Denson-Low

[57] ABSTRACT

An electric power system particularly adapted for use in powering the electric motor or motors used in the drive train of an electric vehicle. The power system includes a power cell which is a continuous flow concentration cell which utilizes the electrochemical reaction between an acid electrolyte and a base electrolyte to produce electrical energy. Both the acid and base electrolyte utilized in the power cell are kept in external reservoirs. The use of external reservoirs for the electrolytes provides for increases in the energy of the system which is only limited by the size of the reservoirs. Recharging of the system is quickly and conveniently accomplished by recharging the reservoirs with fresh electrolyte, or by electrically recharging the system.

29 Claims, 3 Drawing Sheets

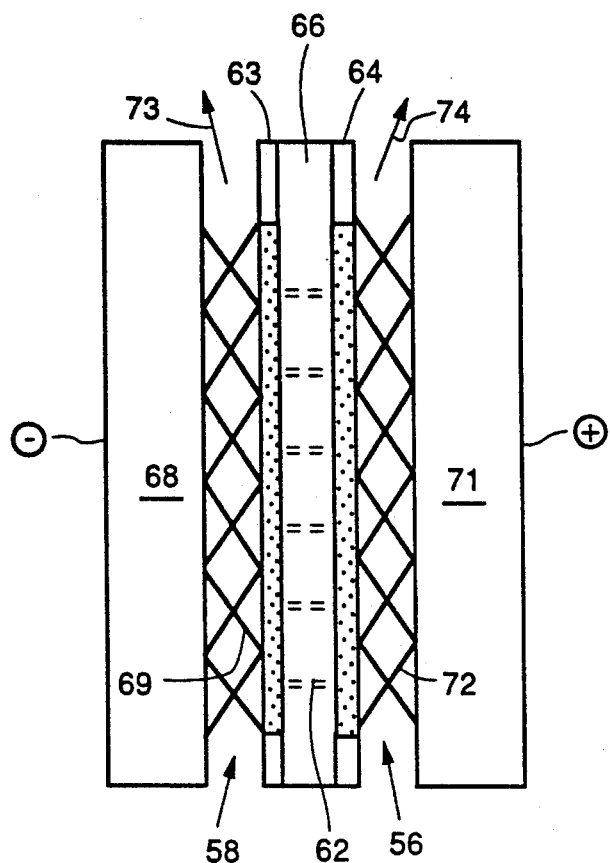
FIG. 3.
FIG. 4.
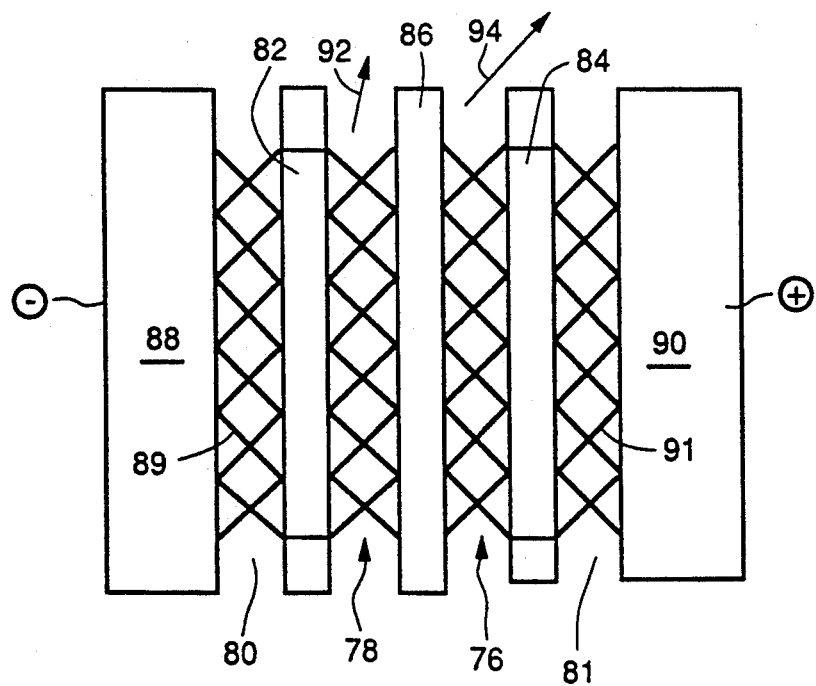

ACID-BASE CONCENTRATION CELL FOR ELECTRIC POWER GENERATION

BACKGROUND OF THE INVENTION

1. Field of the Invention

The present invention relates generally to electric power generation, in particular for electric vehicles, and the rechargeable power systems used to power the electric motors present in such vehicles. More particularly, the present invention relates to an acid-base concentration cell for use in powering an external system, such as an electric vehicle, wherein the acid and base electrolytes for the cell are stored in external tanks and cycled to the cell on demand. The present invention also relates to any application in which a high energy density, high power density, rechargeable or refuelable electric power source is required.

2. Description of Related Art

The foremost consideration in the design of electric vehicles is the battery or fuel cell. In order for electric vehicles to be of practical use, it is essential that batteries or fuel cells having sufficient energy density and power density be developed. The energy density of a battery determines the range or distance a vehicle can be driven between recharging. On the other hand, power density determines the power available for acceleration and high speed driving. It is important that the battery or fuel cell used to power the drive train motors in an electric vehicle have both high energy density and power density.

Electric vehicles are now generally powered by lead-acid batteries. Such batteries are heavy and have a relatively limited cycle life when used at the high depth of discharge required for providing the most range for electric vehicles. Even at high depth of discharge, the low energy density of lead-acid batteries provides a range of only about 50 miles for a small van. In addition, recharging of lead-acid batteries is a relatively slow process requiring a battery charger which must be connected to a source of electricity. Other potential power sources have been suggested, such as sodium-sulfur batteries. However, the materials used in such batteries present problems of their own and sodium-sulfur batteries must be operated at high temperatures.

It would be desirable to provide a battery or fuel cell which can be either conventionally recharged, or refueled quickly without relying on conventional battery recharging systems. Also, it would be desirable to refuel using inexpensive, commonplace, non-fossil, non-polluting, non-explosive, non-flammable, chemically stable liquids. Further, it would be desirable to provide a power system wherein both the energy density and power density are high enough to power the drive train motors of an electrical vehicle to achieve performance characteristics, i.e. acceleration, top speed and range, which are acceptable by present day automotive standards.

In addition to electric vehicles, other possible uses for this invention include all applications for which secondary batteries or fuel cells can be used. Some such uses are remote location power, aircraft batteries, military batteries, and utility peak power shaving.

SUMMARY OF THE INVENTION

In accordance with the present invention, an electric power system is provided for powering an external system, such as one or more electric motors present in an electric vehicle wherein the energy density and power density of the battery-like fuel cell is sufficient to achieve acceptable acceleration, speed, life and range for an electrical vehicle.

The present invention provides power for a battery or fuel cell by using acid and base, which has heretofore never been done. The present invention is based upon an acid-base depolarized hydrogen-ion concentration power cell wherein the acid and base electrolytes are stored separately from the power cell in a storage system of external reservoirs. The electrolytes are transferred to the power cell on demand to provide generation of electricity. The partially spent acid solution and partially spent base solution generated in the power cell are removed and transferred to separate reservoirs or, preferably, the partially spent solutions (hereafter referred to as spent solutions) are recycled back to their respective electrolyte reservoirs. Once all of the acid and base electrolyte have been consumed, the power cell is then replenished by filling the reservoirs with fresh electrolyte. This can be done in either of two ways: (1) when the spent solutions are recycled back to the electrolyte reservoirs, the replenishing process involves first removing the spent solutions from the reservoirs and then refilling the storage reservoirs with fresh acid and base electrolyte; and (2) the power cell can be recharged electrically in the same manner as a battery is charged by an external charger. The spent solutions are simply cycled through the power cell until their original concentrations have been regained.

As a feature of the present invention, the size of the acid and base storage system reservoirs can be selected to provide whatever range is desired for the vehicle. The only limitation on the range of the electric vehicle is the size of electrolyte reservoir. As another feature of the present invention, the power cell with external electrolyte reservoirs can be easily recharged by simply replenishing the reservoirs. The replenishment of the reservoirs can be accomplished by electrically recharging the electrolytes within the system from their respective spent acid and base solutions, or the spent acid and base solutions can simply be drained from the system and the reservoirs filled with fresh electrolyte.

When the spent solutions are drained from the system and the reservoirs filled with fresh electrolytes, those electrolytes can be created in several ways. First, some inexpensive, presently mass produced, acids, bases and salts are used within the chemical industry in very large quantities. Phosphoric acid and sodium hydroxide are inexpensive, mass produced preferred exemplary acid, base pairs. Also, sodium phosphate, the resulting spent solution which is drained from the system, as illustrated in equation (3) below is an inexpensive, mass produced salt. These three chemicals are used in very large volume in today's chemical industry for many diverse purposes. Each chemical sells at a low bulk price. Therefore, fresh and spent electrolytes can be traded within the presently established market of the basic chemical industry.

A second source of fresh electrolyte is the electrical recharging of the spent salt solution back to fresh acid and base in a stationary power cell, at non-peak hours of the electric utility grid. These stationary power cells would be very similar to the electric vehicle power cells. However, one advantage is that when two electric power systems are used, the motive power electric vehicle power cell can be optimized in its design and cost for discharge of electric power, and the stationary power cell can be optimized in its design and cost for recharging.

The above-described and many other features and attendant advantages of the present invention will become better understood by reference to the following detailed description when taken in conjunction with the accompanying drawings.

BRIEF DESCRIPTION OF THE DRAWINGS

FIG. 3 is a diagrammatic representation of a preferred exemplary power cell for use in the present invention.

FIG. 4 is another diagrammatic representation of an exemplary power cell for use in the present invention.

DESCRIPTION OF THE PREFERRED EMBODIMENTS

Figure 1:
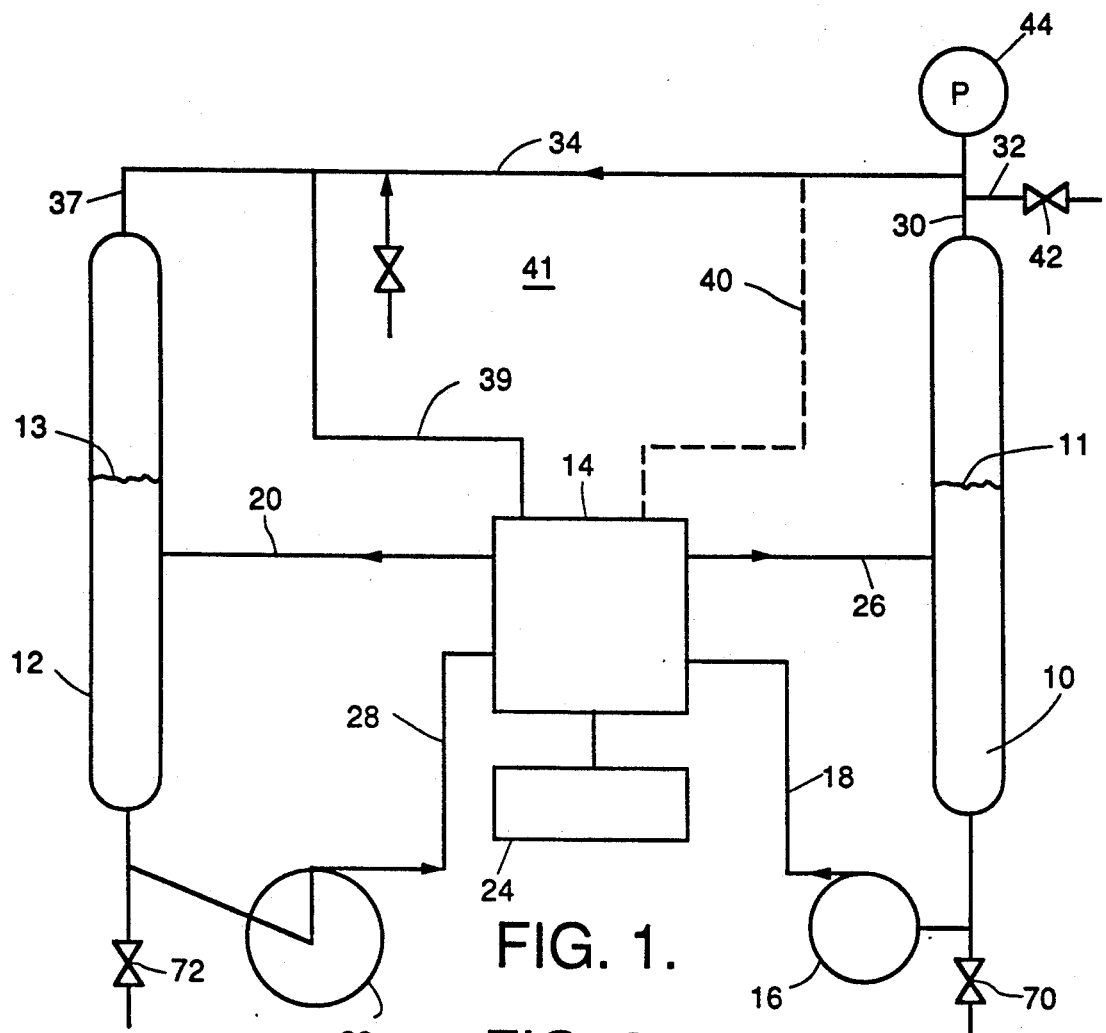
FIG. 1 is a schematic view of a preferred exemplary electric power system in accordance with the present invention.

A preferred exemplary electric power system in accordance with the present invention is shown schematically in FIG. 1. The electric power system is especially well-suited for use in powering the electric motors used in the drive train of an electric vehicle. The power density of the power cell is sufficient to provide adequate acceleration for the vehicle and the use of external electrolyte reservoirs in accordance with the present invention provides the necessary energy density to give adequate range for the vehicle.

Although the electric power system in accordance with the present invention is specifically designed for use in powering electric vehicles, it will be understood by those skilled in the art that the power system may be utilized in any situation where a rechargeable electric power system is required which has relatively high power density and relatively high energy density. Accordingly, the power system is not limited to use in connection with electric motors used as part of an electric vehicle drive train, but may also be used in a vide variety of applications where high power output is required over extended periods of time.

Referring to FIG. 1, the power system includes an acid electrolyte reservoir 10 and a base electrolyte reservoir 12. Both the acid electrolyte reservoir and base electrolyte reservoir are located externally of the power cell 14. The acid and base electrolytes stored in their respective reservoirs 10 and 12 can be any of the electrolyte pairs for which concentrated aqueous solutions of the electrolyte pairs and their common salts have melting points in the vicinity of about 0°–100° C., and which have sufficient acid and base strength to provide a cell voltage of about one volt. This voltage can usually be attained for a Ph differential in the neighborhood of 13 at temperatures of about 100° C. In accordance with the present invention, acids and bases with a pH differential of about 8 to 26 may be used. In general, the acid electrolyte will be a Bronsted acid with the base electrolyte being a Bronsted base. The term "Bronsted acid" is used herein to mean an acid which is characterized by its tendency to release a proton; and the tern "Bronsted base" is used herein to mean a base which is characterized by its tendency to accept a proton. Examples of such acid electrolyte-base electrolyte pairs include, but are not limited to those listed below:

1. Phosphoric acid—sodium, potassium or lithium hydroxide
2. Sulfuric acid—sodium, potassium or lithium hydroxide
3. Methanesulfonic acid—sodium or potassium hydroxide
4. Trifluoramethane sulfonic acid—dibasic ammonium orthophosphate
5. Fluoboric acid—sodium hydroxide
6. Trifluoromethane sulfonic acid—sodium, lithium or potassium hydroxide
7. Methane sulfonic acid—trisodium orthophosphate
8. Trifluoromethane sulfonic acid—ethyl amine
9. Trifluoromethane sulfonic acid—ammonia It may be advantageous in some cases to use a mixture of acids and/or a mixture of bases. For example, advantages may be achieved by mixing phosphoric acid and sulfuric acid to form the acid electrolyte or by mixing sodium hydroxide and potassium hydroxide to form the base electrolyte. The terms "acid electrolyte" and "base electrolyte" as used herein are intended to include such mixtures.

These pairs differ in both differential pH and thermal regenerability of the acid and base reaction products from those acid-base pairs for the operation of thermoelectrochemical systems. These acid-base pairs have a differential pH above about 8 and are not thermally regenerable under practically operated upper regenerating temperatures and conditions. Some of the pairs in the above list may be stable only at lower temperatures. For example it is expected that hydrogen will reduce sulfuric acid at temperatures above 50° C.

The operation of thermoelectrochemical systems in general wherein acid and base electrolytes are used to generate electricity is described in detail in U.S. Pat. Nos. 4,738,904 and 4,810,596, both patents being owned by the common assignee of the present invention. The contents of these two patents, along with the contents of other patents and references cited herein, are hereby incorporated by reference.

The reactions for all acid-base couples may be exemplified by the phosphoric acid-sodium hydroxide example. The electrochemical reactions at the electrodes are shown in Equations (1) and (2) below. At the cathode:

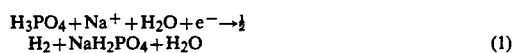

$$H_3PO_4 + Na^+ + H_2O + e^- \rightarrow \tfrac{1}{2} H_2 + NaH_2PO_4 + H_2O \qquad (1)$$

The $H_2$ produced at the cathode is circulated to the anode, where it is consumed. At the anode:

$$OH^- + \tfrac{1}{2} H_2 \rightarrow H_2O + e^- \qquad (2)$$

The net reaction shown in Equation (3) below indicates that an acid and a base react to produce a salt:

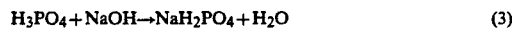

$$H_3PO_4 + NaOH \rightarrow NaH_2PO_4 + H_2O \qquad (3)$$

Thus, in general, at the cathode, hydrogen ions are consumed and hydrogen gas or other reduced species are produced; while, at the anode, hydrogen ions or other oxidized species are produced.

The acid provides a high $H^+$ concentration at the electrode; the $H^+$ produced at the anode is kept low by being immediately reacted with the high concentration of OH⁻ to form water. The difference in H+ concentration provides the cell voltage from the two hydrogen electrodes. Voltage loss from liquid junction potential is negligible. These hydrogen electrodes are of the same type as used in typical fuel cells. Such electrodes are available from numerous sources, e.g. GINER, Inc., of Waltham, Mass. The separator between the two electrodes is preferably a cation exchange membrane such as Nafion, provided by the DuPont Corp. of Wilmington, Del., or Raipore membranes, provided by RAI Research Corp., of Hauppauge, N.Y. The cation membranes cause the salt to collect on the acid side rather than the base side, where it would be fairly insoluble. Data is available which indicates that a closed system could be recharged for about two years before enough phosphate anion would penetrate through the membrane to precipitate on the base side. Of course, at any time that it is refueled instead of recharged, the fluid solutions would be completely drained and replaced with fresh fluids, and accumulation of salt on the base side would be inconsequential. Other electrodes which are suitable for use in the present invention include electrodes which include hydrogen ions as part of their reaction.

Hydrogen electrodes of the fuel cell type used in a similar mode as in this invention have been known to last 14 years and undergo over 10,000 deep discharge cycles without any degradation in performance. Since other parts of the system are passive except for two conventional types of pumps, it is anticipated that this system will also be long lived compared to the short lives of other batteries being considered for electric vehicle life. The differential pressures between the two liquid flows should be capable of being kept to several pounds per square inch (psi). Calculations show that the pumping pressure drops are only about 2 psi (14 kilopascals). The penetration pressure of liquids into the hydrophobic pore structure of the fuel cell electrodes has been measured at 13 psi (190 kPa), well above the calculated pressure drops.

During operation of the power system, the acid electrolyte in reservoir 10 is pumped by pump 16 through line 18 into the concentration power cell 14. At the same time, base electrolyte from reservoir 12 is pumped into the cell 14 via line 28 by pump 22. The acid and base electrolytes are partially consumed during each of many passes through the cell 14 to form electric power which is output to the electric vehicle motor 24. Hydrogen gas is generated on the acid side and recirculated through lines 26, 30, 34, and 39 to the base side where it is consumed. The partially spent acid solution is removed from the cell through line 26. The partially spent base solution is removed from the concentration flow cell through line 20. All of the spaces and lines 30-40 above solution levels 11 and 13 are filled with hydrogen.

The acid solution and hydrogen in line 26 easily separate from each other in the acid electrolyte reservoir.

This mixture of acid and hydrogen gas is unique to the cell design displayed in FIG. 2, and is discussed later. Valve 41 is provided for initial addition of hydrogen within lines 30-40. Pressure gauge 44 is provided for monitoring the equal pressures in the acid, base and hydrogen lines.

Valves 70 and 72 are used for filling or emptying the acid and base reservoirs. Valve 42 is used for drawing an initial vacuum in the system. Acid and base lines 26 and 20 return partially spent acid and base to their respective reservoirs for continuous circulation until the solutions are completely spent as was defined by equation (3) above. Line 39 is the hydrogen access line into channel 50 in FIG. 2 and line 39 also serves as the access line into anode channel 80, while line 40 serves as the hydrogen access line to the acid cathode channel 81 in the cell design displayed in FIG. 4. Access line 40 is not required in cell designs displayed in FIGS. 2 and 3. For the cell design of FIG. 3, line 39 and line 40 into channels 58 and 56, respectively, are optional because hydrogen is transferred directly through the membrane, as subsequently explained.

Figure 2:
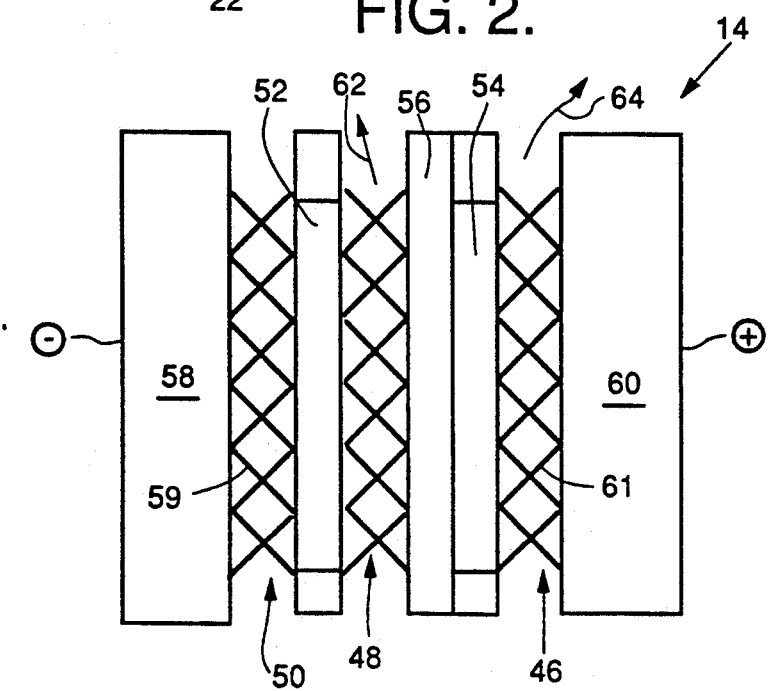
FIG. 2 is a diagrammatic representation of one type of exemplary power cell for use in the power system of the present invention.

The cell design displayed in FIG. 2 can only be used as a discharge cell since hydrogen must be supplied to the acid side of the cell on charge. However, if the flows are switched, so that pump 22 pumps base through line 18, and that pump 16 pumps acid through line 28, then the design of FIG. 2 can be used for both charge and discharge. Care must be taken to drain the cell completely before switching flows, since mixing of acid and base creates excessive heat. This problem does not exist in the cell designs shown in FIGS. 3 and 4, and recharging can take place without altering any system functions by simply attaching a charger. This is analogous to the straightforward charging of conventional battery systems.

It is important to note that for the cell design of FIG. 4, when arranging multiple cells in a bipolar stack, cathode electrode 84 and current collecting screen 91 butt up against the anode 82 of the next cell, and hydrogen is simply transferred to the anode across gas space 81. Strictly speaking, only the two end cells in a stack need be connected to lines 39, 34 and 40. However, it is advantageous to leave all hydrogen gas channels connected through a small single manifold in order to keep all channels 80 and 81 equilibrated at the same hydrogen pressure. An alternative to connecting the hydrogen channels in each cell of a cell stack to a common manifold is as follows: occasionally, before recharging or draining the spent electrolytes, the power cell is drained, and refilled with hydrogen from a very small hydrogen storage cylinder. Slow hydrogen leakage from the system is inevitable, and such a replenishment of hydrogen would be occasionally required. Such a mode of hydrogen replenishment is applicable to both cell designs depicted in FIGS. 3 and 4. In a large system it is anticipated that multiple acid and base storage tanks would be used. Since during discharge, base solution volume decreases and spent acid solution volume increases due to transportation of water and Na+ through the membrane, three options are available:
  a. Extra tanks are provided for spent acid;
  b. Numerous acid and base tanks are used and as a base tank empties it is automatically valved into the acid circulation line; and
  c. The storage tanks are kept at a temperature differential so that water is vapor distilled through line 34 from acid to base, or is simply retarded in its membrane transport by the temperature differential.

Alternative (c) is attractive because another useful feature of this invention is the simplified thermal management for this system. Thermal management of high power density batteries stacked closely together is a significant problem. The fact that fluids are pumped into and out of the power cell, and that the power cell is operated most effectively at about 110°-120° C. is especially expeditious. The fluids transfer heat from the power cell stack to the reservoir storage tanks. The external area of these tanks can be used for heat dissipation, such as by applying air cooling of the tank surfaces. It therefore becomes possible to keep the acid tanks at a somewhat higher temperature than the base tanks in order to promote the retention of water in the base tanks. On charging, the temperature differential can be reversed when sodium ion and water transfer from acid to base. The relative amount of water that transfers through the membrane is highly dependent on the type of membrane used and other physical factors. It is therefore a preferred exemplary condition that both methods (b) and (c) above be used in tandem to maximize system performance and minimize excess storage tank volume.

Referring to FIG. 2, a more detailed schematic representation of cell 14 is provided. The cell 14 includes an acid electrolyte channel 46 into which acid electrolyte from line 18 in FIG. 1 is introduced. The channel into which the base electrolyte is introduced from line 28 is shown at 48. The hydrogen channel through which the recycled hydrogen in line 34 passes into the cell is shown at 50. The hydrogen channel 50 and base electrolyte channel 48 are separated by the cell anode 52. The cathode for the cell is located at 54. The cathode is separated from the base electrolyte by cation exchange membrane 56. The end plates and current leads of the cell are shown at 58 and 60. Current collecting screens 59 and 61 electrically connect the anode 52 and cathode 54 to the external current leads from end plates 58 and 60.

The details of the net cell reaction in which the base electrolyte and acid electrolyte combine via the cation exchange membrane 56 have been described by equations (1), (2), and (3) above. The result of the electrochemical reaction between the acid electrolyte and base electrolyte is the generation of electrical power between the anode 52 and cathode 54, which is removed from the system through the external circuit to the electric motor 24.

The spent base electrolyte solution in channel 48 is removed and recycled to the base reservoir as represented by arrow 62. The spent acid electrolyte solution generated during the cell reaction is removed from channel 46 as represented by arrow 64. It is returned to the acid reservoir through line 26. The hydrogen gas generated in channel 46 is also removed from the cell as represented by arrow 64 for transport to the hydrogen recycling line 34 through line 26.

As a particular feature of the present invention, the cell 14 may be operated to generate electricity so long as acid and base electrolyte are introduced into the cell. Accordingly, the energy density of the system is governed by the size of the acid reservoir 10 and base reservoir 12, in comparison to the size of the cell. Preferably, the acid and base reservoirs 10 and 12 will be made as large as possible within the limits required for a particular vehicle. Acid reservoirs on the order of 45 gallons of acid electrolyte, such as phosphoric acid may be used in combination with a base electrolyte reservoir having a capacity on the order of 45 gallons of a base electrolyte, such as sodium hydroxide, for a small van. For such a van the overall energy density should be about 95 watthours per kilogram (wh/kg), with a vehicle range of about 200 miles.

Experiments prove the acid and base solutions will retain 91% of their energy through 91% depth of discharge to $NaH_2PO_4$ by recycling to their respective acid and base electrolyte reservoirs as shown in FIG. 1. This allows for maximization of the initial acid or base electrolyte load for the vehicle. When all of the electrolyte has been used up, the acid and base reservoirs will be full of their respective spent solutions. At this point, the system must be recharged. With respect to the acid reservoir 10, a valve 70 is provided for draining the spent acid solution from the reservoir 10. After removal of the spent acid solution, the reservoir 10 is then filled with fresh acid electrolyte through valve 70. The procedure for the base reservoir is the same. The spent base solution is removed from the reservoir 12 through valve 72 followed by filling of the reservoir 12 with fresh base electrolyte through the same valve 72.

A preferred acid electrolyte-base electrolyte combination is phosphoric acid and sodium hydroxide due to a cost of only about $200 for the initial fluids.

In one preferred embodiment, the spent acid and base solutions are removed from the system and recharged at a later time in a separate charging device to convert them back to acid and base electrolytes which can be reused in the power system. In this embodiment it is possible to quickly replenish the system by draining and filling the external tanks with fresh electrolyte even while draining is taking place. Alternatively, it is possible to recharge the power system in situ. This recharging system reverses the electrode reactions and regenerates the original acid and base electrolyte.

As was previously discussed, there are several cell designs that are possible for in situ rechargeability, but the optimum design for both discharge and recharge is shown in FIG. 3. On discharge the acid electrolyte enters the power cell from tank 10 at 56 and exits for return to tank 10 at 74. Likewise the base electrolyte enters the cell at 58 from tank 12 and returns to its tank 12 from the cell exit 73. The separate structure of fuel cell electrode 52, or 82 and 84 is eliminated. Instead, electrodes 63 and 64 are bonded directly to cation membrane 66 to produce a structure essentially the same as used in state-of-the-art solid polymer electrolyte fuel cells, and available, for example, from Ballard Power Systems, Inc., of North Vancouver, British Columbia, Canada. The main difference is that very small hydrophobic holes 62 are purposefully introduced into the cation membrane. In this way the hydrogen gas produced at the cathode can be directly passed to the anode without requiring exit lines 26 and 34 and a separate fuel cell electrode structure 52. This design is less costly and lower in cell impedance, and therefore higher in power density than other designs. It is a design developed and described in detail in U.S. Pat. No. 4,865,925, the patent being owned by the common assignee of the present invention. A one psi (7 kPa) drop in hydrogen pressure will allow a flow of $H_2$ through about 0.1 micron holes equivalent to a current of 800 $mA/cm^2$. A hole density of about 1% void ratio in the membrane is sufficient to sustain such a current density. This current density is more than sufficient to yield a power density in excess of that required to, in turn, provide the 95 wh/kg of energy discussed earlier.

Recharging is the same as for any battery, namely, the current in the cell is reversed. Electrodes 63 and 64 are connected respectively to the negative and positive terminals of the charger through end plates 68 and 71 and current collecting screens 69 and 72 so that $H_2$ flows through the holes 62 from electrodes 63 to 64, thereby replenishing the respective acid and base electrolyte reservoirs 10 and 12 by reversing the reactions in equations (1) and (2). The pumps 16 and 22 operate in the same direction as previously and the circulation continues until the acid and base are replenished to their original strength and composition.

As previously mentioned, the design of FIG. 4 is especially suitable for bipolar stacking of cells. Instead of end plates 88 and 90, a repeating cathode 84 butts up against a repeating conductive screen 89 and hydrogen channel 80 which is bounded by a repeating anode 82. The base inlet 78 and outlet 92 are likewise repeating as are also membrane 86, and acid inlet 76 and outlet 94. Hydrogen channel 81 and conducting screen 91 are the repeating units of 80 and 89, respectively, in the adjacent cell. This cell has the highest iR drop, but the least weight in a bipolar stack because of the absence of metal plates and reduced number of current collecting screens.

Using the phosphoric acid—sodium hydroxide system as an example, charging experiments gave a concentration ratio of the replenished base solution of 2 moles of water to one mole of NAOH, whereas the composition ratio obtained for the replenished acid was 3 moles $H_3PO_4$ to one mole $NaH_2PO_4$ and one mole of $H_2O$. A bilayer cation exchange membrane was used; for example, Nafion 906, from Dupont, of Wilmington, Del., or R1010/CRP-7 from RAI, Inc., of Hauppauge, N.Y. Also a special exemplary bilayer membrane can be made by coating a membrane such as a weak acid, dense and/or highly cross-linked cation exchange membrane CRP-7 with a very thin film of strong acid Nafion cation exchange membrane material.

These same regenerated solution compositions were used in calculating the 95 wh/kg discharge energy density for the small van.

When free-standing fuel cell electrode structures are not used, as is the case for the cathode of the cell of FIG. 2 and the cathode and anode for the cell of FIG. 3, the electrodes are bonded directly to the membrane by methods well-known to those familiar with the solid polymer electrolyte fuel cell technology. However to optimize, in particular, cathode performance in cells of the type shown in FIGS. 2 and 3, a special dual porosity electrode structure is employed, which includes plasma etching of the membrane and the use of zinc dust in the cathode which is later leached. These techniques are disclosed in U.S. patent application Ser. No. 07/839,521, filed Feb. 21, 1992, which is owned by the common assignee of the present invention.

The various cell designs which have been discussed all operate under the same conditions of temperature and pressure. For the phosphoric acid, sodium hydroxide system discussed earlier, the temperature range of operation is approximately $-20°$ C. to $+120°$ C., a very favorable range for the electric vehicle. The concentrated solutions discussed above remain partially liquid down to at least $-20°$ C. This liquidus range raises another critical feature of the thermal management system based upon the use of one or the other of the electrolyte reservoir storage tanks as a heat dissipation or system cooling surface. The remainder of the system is thermally insulated so that only the storage tank is used for heat removal. When the system is left inoperative for a period of time, it will slowly cool and partial precipitation of salt will occur. In order to prevent clogging of the liquid passages in the power cell and the lines connecting the power cell and reservoir storage tanks, a filter is included in any tank used for cooling. When the system is shut down, the pumps are kept operating for a period of time at a slow rate so that all of the salt freeze-out is retained by the filter. The remaining liquid will actually be energy enriched. When the system is restarted, it will heat itself and the salts will redissolve, no matter if the start-up is for discharging the system or recharging it.

The system pressure is preferably determined by the hydrogen pressure. This pressure can be set over a range from approximately slightly above ambient pressure, i.e. 15 psia (100 kPa) to about 50 psia (350 kPa).

Examples of the practice of the present invention are presented below.

EXAMPLE 1

A dual porosity cathode structure was bonded to a plasma-etched RAI, Inc. R1010 membrane by methods described above. The anode consisted of a porous Teflon backed fuel cell electrode supplied by GINER, Inc. of Waltham, Mass.

This electrode assembly was then installed with current collector screens and manifolds to provide the cell shown schematically in FIG. 2 wherein hydrogen was exposed to the back of the anode and base solution was exposed to the front of the anode. The cell was then installed into a cell test loop as shown in FIG. 1. This system included storage tanks, circulating pumps and means for transporting the hydrogen from the cathode to the anode.

To begin the discharge test, the electrochemical apparatus was evacuated through line 32 by means of a vacuum pump. Then valve 42 was closed and the vacuum was used to draw 85 weight % phosphoric acid into the acid tank 10, and 20 molar sodium hydroxide was drawn into the base storage tank 12. Next, hydrogen was introduced into the system to a pressure of 35-40 psia (242-272 kPa) through valve 41. The cell was heated to 75° C. and the pumps 16 and 22 were started.

Polarization measurements (current versus voltage) were then conducted on the electrochemical call. The results are presented in FIG. 5. A maximum power density of 140 milliwatts per square centimeter (mw/cm$^2$) wes obtained at 75° C. At 20° C., the maximum power density was 95 mw/cm$^2$. The maximum power of 140 mw/cm$^2$) equates to a cell power density of 580 watts/kg. This conversion is based on taking into account manifolds, end plates, ohmic contact losses, and calculated pumping and shunt losses for a 250 Volt electric vehicle sized bipolar stack.

The depth of discharge (DOD) results are shown in Table 1. One hundred % DOD is equivalent to converting all acid to pure salt ($NaH_2PO_4$). The electric vehicle design point compositions of acid and base were used. These are the initial acid composition ratio of acid: salt:water of 3:1:1 and base composition ratio of base: water of 1:2.

TABLE 1

| Dept of Discharge vs. Open Circuit Voltage at 75° C. | |
|---|---|
| DOD | Volts |
| 0 | 0.94 |
| 91 | 0.86 |

Both of these voltages agree well with the theoretical voltages expected from a $H_3PO_4$:NAOH composition vs. pH curve for dilute solutions of acid and base. The fact that the concentrated solution activity effects are similar to the dilute activities may seem fortuitous, but is not particularly unexpected from the complete Debye-Hückel treatment and its extensions for concentrated electrolytes.

A charging test was then conducted to verify the ability to recharge the system. To begin the charging test, the phosphoric acid and sodium hydroxide were drained and mixed together to form sodium phosphate solution, $NaH_2PO_4$, the fully discharged cell product. The sodium phosphate was then returned to the base electrode tank 12. The acid electrolyte tank 10 was left empty. The cell was heated to 75° C. Current was then applied to charge the cell. The basic fluid that was produced was collected in the empty tank. Acidic fluid that was produced was allowed to accumulate in the sodium phosphate solution. After the test, the basic fluid was drained and analyzed by calorimetric titration.

Results of the cell charge tests are shown in Table 2.

TABLE 2

| | Cell Charging Test | |
|---|---|---|
| Membrane Type | Initial Coulombic Efficiency | Final Efficiency at 3:1 Ratio Acid to Salt |
| Nafion 906 bilayer | 91 | 76 |
| RAI R1010/ CRP-7 bilayer | 79 | — |

Figure 5:
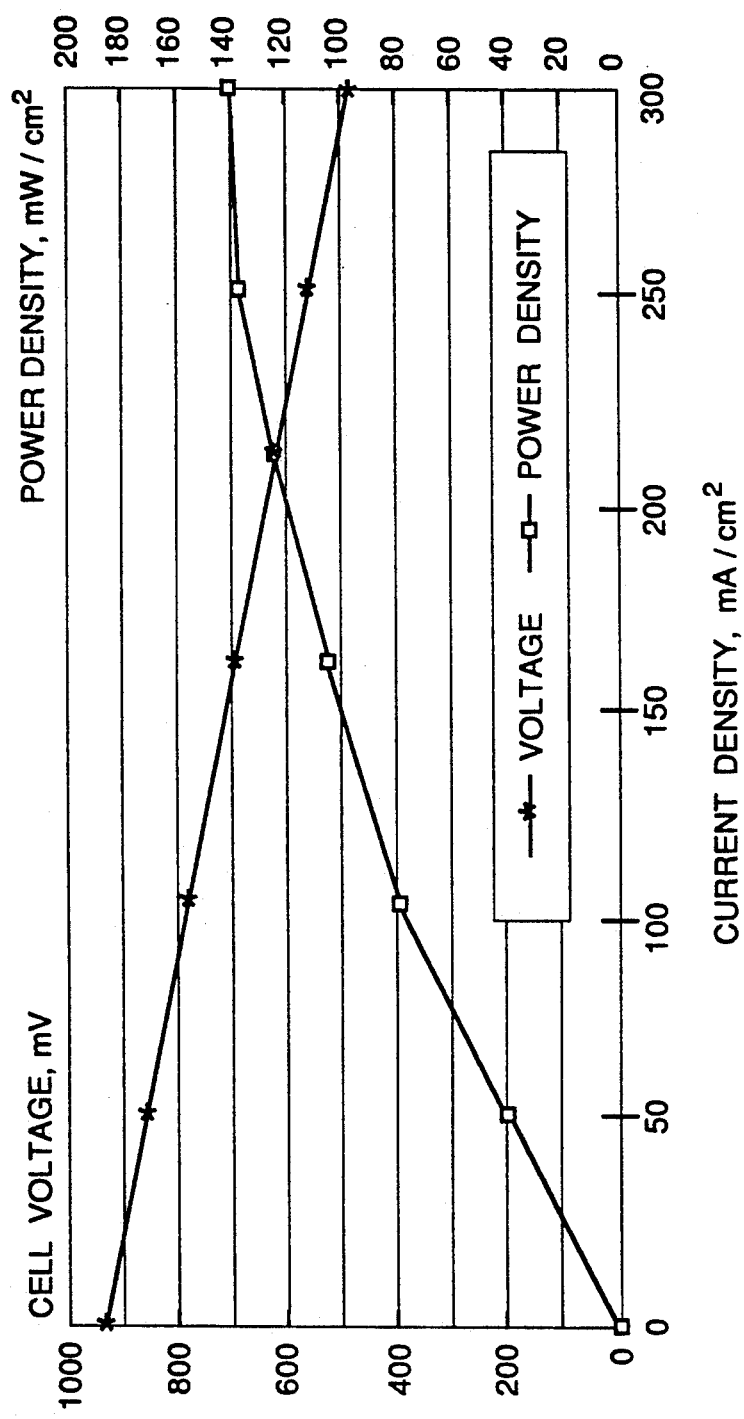
FIG. 5 is an experimental voltage vs. current density plot for the power cells displayed in FIG. 2 and FIG. 4.

The voltage efficiency is similar on charge to the discharge data given in FIG. 5. The recharge was taken from a solution of pure $NaH_2PO_4$ to a ratio of $H_3PO_4$:$NaH_2PO_4$ of 3:1, which is the electric vehicle design point upon which the previously stated energy densities are based. The sodium hydroxide reconstitution was to a 20 Molar solution or 2 moles of water per mole of sodium hydroxide, which is also the previously mentioned electric vehicle design point. The coulombic efficiency when the charging was ⅔ completed was 894 for the Nafion 906 membrane.

The discharge test results show that substantial amounts of power can be obtained from the cell. Furthermore, the open circuit voltage is close to the thermodynamic value expected for acid-base neutralization reactions. The charging test shows that sodium hydroxide and phosphoric acid were produced when current was applied to the cell.

For recharging it is preferred that a bilayer membrane be used for selecting sodium ions and rejecting hydroxyl groups. This requirement for the ion exchange membrane is not absolutely necessary, especially in those power systems where in situ recharging is not contemplated and recharging is to be done by emptying the reservoirs and filling them with fresh electrolyte.

However, it is also desirable to have a rechargeable system which is optimized for both charge and discharge, using the same power cell with the same membrane for both charge and discharge. A bilayer membrane is needed only on charge and adds some cell resistance because it consists of two layers, one of which is denser than membranes used for discharge only. This effect can be mitigated by using the rather low resistance but dense RAI CRP-7 membrane and coating it with a thin Nafion film cast directly onto the CRP-7 surface. In this case the resistance of the bilayer membrane would be increased only slightly over the RAI R1010 membrane, and discharge performance would be the least compromised.

EXAMPLE 2

The open circuit voltages of several acids were compared in cells at 20° C. The effect of lower voltages at 20° C. compared to data reported in Example 1 at 75° C. can be taken into account by the fact that the cell voltages should be approximately proportional to the ratio of the absolute temperatures. Also the effect of water content was measured in both the acid and the base, as was also the effect of adding salt to the acid side. The results are given in Table 3. The only base used was sodium hydroxide (NaOH). The only salt data obtained was for monobasic sodium phosphate ($NaH_2PO_4$).

TABLE 3

| | Room Temperature Voltages | | |
|---|---|---|---|
| Acid | Acid:Water: Salt (moles) | Base (moles/ liter | Open- circuit (volts) |
| 96% Sulfuric | 1:0:0 | 10 | 1.70 |
| | 1:1:0 | 10 | 1.35 |
| | 1:2:0 | 10 | 1.26 |
| 99% Trifluoromethane- sulfonic Acid | 1:0:0 | 20 | 1.60 |
| | 1:0:0 | 10 | 1.41 |
| | 1:0.5:0 | 20 | 1.43 |
| | 1:1:0 | 10 | 1.20 |
| 85% Orthophosphoric Acid | 1:1:0 | 10 | 0.77 |
| | 1:1:0.2 | 10 | 0.77 |
| | 1:2:0.2 | 20 | 0.77 |

It is surprising that sulfuric acid gives a higher voltage than trifluoromethanesulfonic (triflic) acid. The leveling effect of water is clearly evident, the voltage decreasing to 1.26 volts. The advantage of keeping the base concentrated at the electric vehicle design point level and the level achieved in the recharging (20 moles/liter) in Example 1 is evident with both the triflic and phosphoric acid cells. In the pure triflic cell, the voltage increased by 0.2 volt when the base concentration was increased. Adding some water to the acid side brought this voltage down again by 0.2 volts, but adding more water had no further effect (compare the 0.2 volt drop at 20 molar base and the 0.2 volt drop at 10 molar base where twice as much water was added to the acid side). In the phosphoric acid cell, adding water to the acid side and withdrawing it from the base side had the same cancellation effect as for the triflic acid.

It is notable that adding a small amount of salt to the phosphoric acid side did not lower the voltage, which can perhaps be explained by the Debye-Hückel theory of the enhancement of activity caused by the salting-out effect in concentrated solutions.

Although the present invention has been described with respect to certain preferred electrolyte pairs, it will be noted by those skilled in the art that a wide range in selection of working electrolytes and cell geometries is possible. For example, any highly soluble acid or base which can form a highly soluble salt and is stable to hydrogen can be used as an electrolyte. Also, a more compact fuel cell geometry can be used if the ion exchange membrane is permeable to hydrogen as well as cations, such as the membrane described in U.S. Pat. No. 4,865,925 which is owned by the common assignee of the present invention. It should also be noted that the various cell designs of the present invention are all amenable to "bipolar" stacking of multiple cells. Other membranes such as non-selective membranes can also be used, although the efficiency of the power system might be lessened, and the membranes may be effective only in the refuelable mode.

Having described exemplary embodiments of the present invention, it should be noted by those skilled in the art that the within disclosures are exemplary only and that various other alternatives, adaptations and modifications may be made within the scope of the present invention. Accordingly, the present invention is not limited to the specific embodiments as illustrated herein, but is only limited to the following claims.

What is claimed is:

1. An electric power system for generating electrical power, said system comprising:
   (a) an acid electrolyte reservoir containing an acid electrolyte having a first pH;
   (b) a base electrolyte reservoir containing a base electrolyte having a second pH, wherein the difference between said first pH and said second pH is sufficient to produce a cell voltage;
   (c) an acid-base depolarized hydrogen-ion concentration power cell comprising:
      (1) an anode compartment containing said base electrolyte;
      (2) a cathode compartment containing said acid electrolyte;
      (3) a hydrogen-ion reacting cathode located within said cathode compartment wherein hydrogen ions are consumed and hydrogen gas or other reduced species and spent acid solution are produced at said cathode during generation of said electrical power;
      (4) a hydrogen-consuming anode located within said anode compartment wherein hydrogen ions or other oxidized species and spent base solution are produced at said anode during generation of said electrical power, and wherein said cathode and anode are connectable externally of said cell for generation of electrical current therebetween;
      (5) an ion exchange membrane located between said anode compartment and said cathode compartment;
      (6) an acid electrolyte inlet through which said acid electrolyte is introduced into said cathode compartment from said acid electrolyte reservoir;
      (7) a base electrolyte inlet through which said base electrolyte is introduced into said anode compartment from said base electrolyte reservoir;
   d) means for transferring acid electrolyte from said acid electrolyte reservoir to said acid electrolyte inlet;
   e) means for transferring base electrolyte from said base electrolyte reservoir to said base electrolyte inlet;
   f) means for transferring spent acid solution from said cathode compartment back to said acid solution reservoir;
   g) means for transferring spent base solution from said anode compartment back to said base solution reservoir;
   h) means for transferring said hydrogen gas from said cathode to said anode; and
   i) means for transferring electric power generated in said cell to an external system.

2. The electric power system according to claim 1 wherein said difference between said first pH and said second pH is about 8 to 26.

3. The electric power system according to claim 1 wherein concentrated aqueous solutions of said acid electrolyte, said base electrolyte, and the common salts thereof have melting points of about zero to 100° C.

4. The electric power system according to claim 1 wherein said ion exchange membrane consists of a bilayer cation membrane comprising a weak acid, dense or highly cross-linked cation exchange membrane, and a strong acid cation exchange membrane.

5. The electric power system according to claim 1 wherein said base electrolyte is provided in the ratio of 2 moles of water to one mole of sodium hydroxide, and said acid electrolyte is provided in the ratio of 3 moles of phosphoric acid to one mole of $NaH_2PO_4$ and one mole of water.

6. The electric power system according to claim 1 further comprising means for recharging said power cell to regenerate said acid electrolyte and said base electrolyte.

7. The electric power system according to claim 1 wherein said spent acid solution reservoir is located in said acid electrolyte reservoir wherein said spent acid solution is recycled from said power cell to acid electrolyte reservoir.

8. The electric power system according to claim 7 wherein said spent base solution reservoir is located in said base electrolyte reservoir wherein said spent base solution is recycled from said power cell to base electrolyte reservoir.

9. The electric power system according to claim 1 wherein said acid electrolyte reservoir comprises means for introducing fresh acid electrolyte into said acid electrolyte reservoir.

10. The electric power system according to claim 9 wherein said base electrolyte reservoir comprises means for introducing fresh base electrolyte into said base electrolyte reservoir.

11. The electric power system according to claim 7 wherein said acid electrolyte reservoir comprises means for removing spent acid solution from said acid electrolyte reservoir and introducing fresh acid electrolyte therein when said reservoir becomes filled with spent acid solution.

12. The electric power system according to claim 8 wherein said base electrolyte reservoir comprises means for removing spent base solution from said base reservoir and introducing fresh base electrolyte therein when said reservoir becomes filled with spent base solution.

13. An electric power system according to claim 12 wherein said acid electrolyte reservoir comprises means for removing spent acid solution from said acid electrolyte reservoir and introducing fresh acid electrolyte therein when said reservoir becomes filled with spent acid solution.

14. The electric power system according to claim 1 further comprising means for cooling said acid electrolyte reservoir and said base electrolyte reservoir to thereby control the temperature in said system.

15. The electric power system according to claim 1 wherein said external system comprises one or more electric motors present in an electric vehicle.

16. A method for providing electric power to an external system, said method comprising the steps of:
   (a) providing an acid-base depolarized hydrogen-ion concentration power cell comprising:
      (1) an anode compartment containing said base electrolyte;
      (2) a cathode compartment containing said acid electrolyte;

(3) a hydrogen-ion reacting cathode located within said cathode compartment wherein hydrogen ions are consumed and hydrogen gas or other reduced species and spent acid solution are produced at said cathode during generation of said electrical power;

(4) a hydrogen-consuming anode located within said anode compartment wherein hydrogen ions or other oxidized species and spent base solution are produced at said anode during generation of said electrical power, and wherein said cathode and anode are connectable externally of said cell for generation of electrical current therebetween;

(5) an ion exchange membrane located between said anode compartment and said cathode compartment;

(6) an acid electrolyte inlet through which said acid electrolyte is introduced into said cathode compartment from said acid electrolyte reservoir;

(7) a base electrolyte inlet through which said base electrolyte is introduced into said anode compartment from said base electrolyte reservoir;

(b) introducing acid electrolyte from an acid electrolyte reservoir into said power cell;

(c) introducing base electrolyte from a base electrolyte reservoir into said power cell;

(d) reacting said acid and base electrolytes in said power cell to produce electric power, spent acid solution and spent base solution;

(e) removing spent acid solution from said power cell;

(f) removing spent base solution from said power cell;

(g) transferring hydrogen gas from said cathode to said anode; and (h) transferring electric power from said power cell to said external system.

17. The method for providing electric power according to claim 16 wherein said spent acid solution is recycled to said acid electrolyte reservoir.

18. The method for providing electric power according to claim 17 wherein said spent base solution is recycled to the base electrolyte reservoir.

19. The method for providing electric power according to claim 17 wherein, when said acid electrolyte reservoir becomes filled with spent acid solution, said spent acid solution is removed from said acid electrolyte reservoir and replaced with fresh acid electrolyte.

20. The method for providing electric power according to claim 19 wherein said removed spent acid solution is electrically treated to form said fresh acid electrolyte and fresh base electrolyte.

21. The method for providing electric power according to claim 18 wherein, when said base electrolyte reservoir becomes filled with spent base solution, said spent base solution is removed from said base electrolyte reservoir and replaced with fresh base electrolyte.

22. The method for providing electric power according to claim 21 wherein said removed spent base solution is electrically treated to form said fresh base electrolyte.

23. The method for providing electric power according to claim 21 wherein when said acid electrolyte reservoir becomes filled with spent acid solution, said spent acid solution is removed from said acid electrolyte reservoir and replaced with fresh acid electrolyte.

24. The method for providing electric power according to claim 16 wherein said external system comprises at least one motor in an electric vehicle.

25. The method for providing electric power according to claim 16 wherein said power cell operates at a temperature within the range of $-20°$ C. to $+120°$ C.

26. The method for providing electric power according to claim 16 further comprising recharging said power cell to regenerate said acid electrolyte and said base electrolyte.

27. The electric power system according to claim 1 wherein said concentration power cell includes means for removing hydrogen gas from the cathode compartment and means for introducing said hydrogen gas into said anode compartment.

28. The electric power system according to claim 1 where said concentration power cell comprises a plurality of stacked hydrogen-ion reacting anodes and cathodes.

29. The electric power system according to claim 1 wherein said ion exchange membrane allows hydrogen gas produced at said cathode to pass from said cathode compartment through said membrane to said anode compartment.

* * * * *